United States Patent [19]

Mower et al.

[11] Patent Number: 5,048,053
[45] Date of Patent: Sep. 10, 1991

[54] DETECTING AND TRACKING CIRCUIT FOR COMPONENT PN CODES

[75] Inventors: Vaughn L. Mower, Bountiful; John W. Zscheile, Jr., Farmington, both of Utah

[73] Assignee: Unisys Corporation, Blue Bell, Pa.

[21] Appl. No.: 439,133

[22] Filed: Nov. 20, 1989

[51] Int. Cl.[5] ............................................. H04L 27/30
[52] U.S. Cl. ........................................ 375/1; 375/115; 370/107; 380/34; 329/307; 329/309
[58] Field of Search ................. 380/46, 47, 34; 375/1, 375/115; 370/18, 107; 329/306, 307, 309, 310

[56] References Cited

U.S. PATENT DOCUMENTS 4,638,494 1/1987 Kartchner et al. ................. 375/115
4,776,012 10/1988 Zscheile, Jr. et al. ................. 380/46

Primary Examiner—Stephen C. Buczinski
Assistant Examiner—Bernarr Earl Gregory
Attorney, Agent, or Firm—John B. Sowell; Mark T. Starr; Tomas J. Scott

[57] ABSTRACT

In a demodulator circuit for receiving a direct sequence spread spectrum signal having composite PN codes, there is provided a novel detecting and tracking circuit for faster acquisition of the component PN codes. The first component code of the received composite direct sequence spread spectrum code is noncoherently detected in a noncoherent detection branch and the subsequent component codes of the composite code are automatically detected in a coherent lock detection branch to provide faster acquisition than was heretofore possible. Further, while the noncoherent detection branch is acquiring the first component PN code, a novel coherent carrier tracking loop is acquiring and locking onto the direct sequence spread spectrum signal carrier.

19 Claims, 4 Drawing Sheets 5,048,053

DETECTING AND TRACKING CIRCUIT FOR COMPONENT PN CODES

BACKGROUND OF THE INVENTION

1. Field of the Invention

The present invention relates to demodulators for direct sequence spread spectrum component pseudonoise (PN) codes. More particularly, the present invention relates to a demodulator for faster acquisition of component codes having a novel detecting circuit and a novel carrier tracking circuit.

2. Description of the Prior Art

Demodulator circuits for component codes are not new. Such circuits are classified in International Class H04L 9/04 and in U.S. Classes 375/I and 380/34. Circuits for generating component codes are described in our U.S. Pat. No. 4,225,935, assigned to the same assignee of the present invention. This patent and references cited therein relate primarily to the method of generating component codes and describe only generally the circuits for recovering the component codes so generated.

To provide a more thorough review of demodulator circuits of the type employed in the prior art for recovering component codes, the prior art known to exist in products supplied by the Unisys Corporation will be described in greater detail hereinafter with reference to the drawings showing the prior art demodulators in this application.

Heretofore, it was generally believed that it was necessary to search each component code of a composite code sequence utilizing non-coherent detection techniques.

The present invention provides a circuit and system which permits COHERENT detection and tracking of all of the component codes of a composite code sequence after detecting the first component code of the composite code sequence by NONCOHERENT techniques.

SUMMARY OF THE INVENTION

It is a primary object of the present invention to provide a novel detecting and tracking circuit for component PN codes.

It is a principal object of the present invention to provide a novel detecting circuit comprising parallel coherent and noncoherent branches.

It is a principal object of the present invention to provide a novel coherent carrier tracking circuit comprising two interdependent phase locked loops which are frequency referenced to the incoming signal and to a highly accurate reference frequency source.

It is a principal object of the present invention to provide a novel coherent tracking loop having a dependent frequency offset loop embedded in the carrier tracking loop.

It is a principal object of the present invention to provide a novel frequency offset loop having means for automatically presenting doppler error correction information into the carrier tracking loop to reduce search and acquisition time by reducing frequency uncertainty.

It is an object of the present invention to provide a novel detecting circuit which sequentially employs noncoherent detecting of the first component of a composite code sequence and then employs coherent detection of the subsequent components of the composite code sequence.

It is object of the present invention to provide novel detecting and tracking circuits which are A.C. coupled to the baseband signal following the down conversion of the IF signal to the baseband.

It is a general object of the present invention to provide a new and improved spread spectrum demodulation circuit for faster acquisition of component codes than was heretofore possible.

According to these and other objects of the present invention, there is provided a novel demodulation circuit for receiving composite direct sequence spread spectrum codes having both coherent and noncoherent detection branches in the system. There is further provided a coherent tracking loop having an embedded frequency offset loop for reducing acquisition time and frequency uncertainty.

DESCRIPTION OF THE PREFERRED EMBODIMENT

Figure 1:
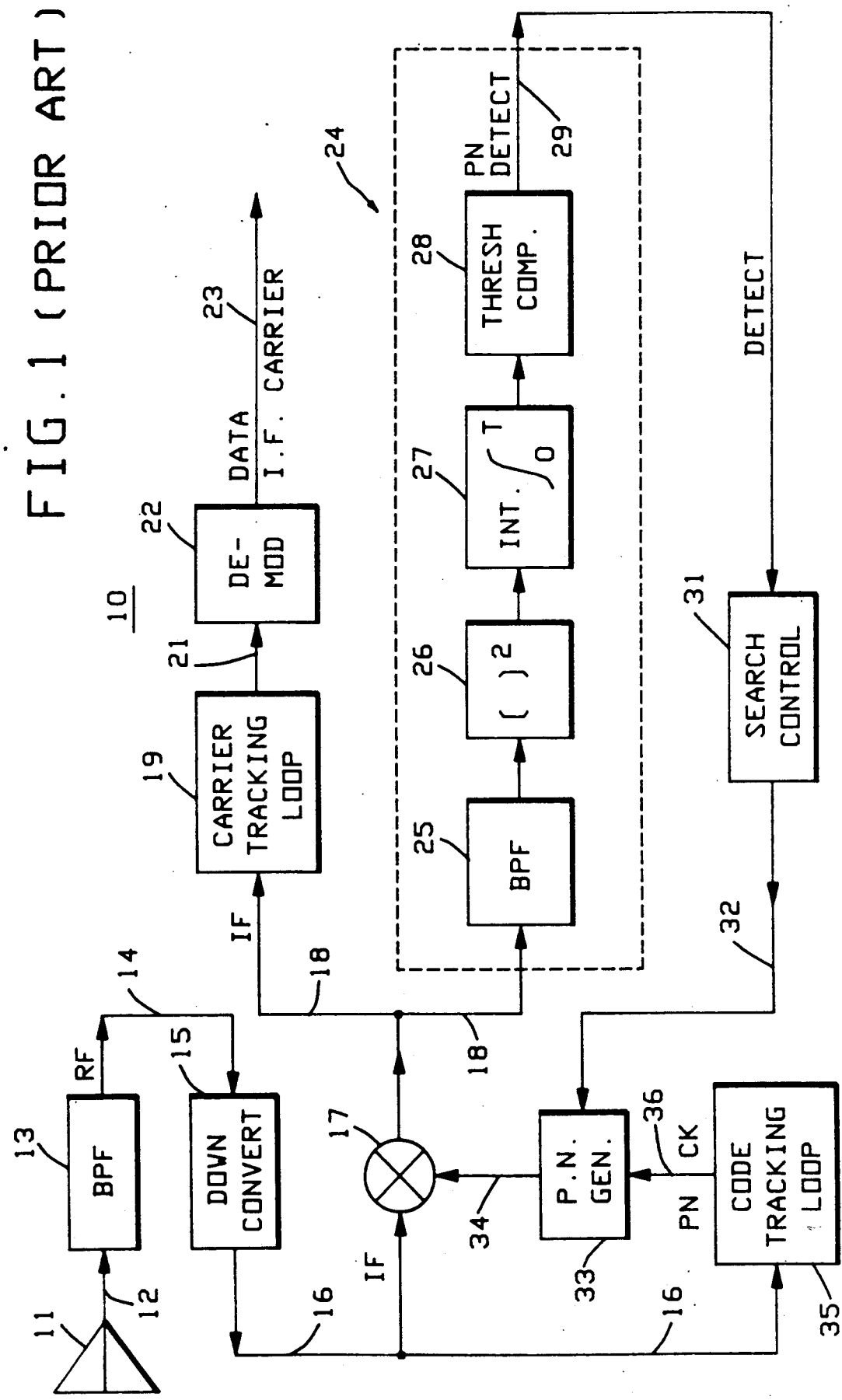
FIG. 1 is a block diagram showing a prior art spread spectrum demodulator for noncoherent detection of a single pseudonoise (PN) code sequence.

Refer now to FIG. 1 showing a prior art spread spectrum demodulator for noncoherent detection of a direct sequence spread spectrum signal having a single PN code sequence. The demodulator 10 is shown having a receiving antenna 11 for receiving the PN code sequence signal and applying via line 12 the code signals to a bandpass filter 13 to produce a filtered R.F. direct sequence spread spectrum signal on output line 14 which is applied to a down converter 15. The IF output signal on line 16 is applied to a correlator/mixer 17 and the output from the mixer 17 on line 18 is applied to a carrier tracking loop 19 to provide a recovered IF carrier and an IF data signal on output line 21. The signal on line 21 is applied to a demodulator 22 to provide the recovered data on output line 23.

The IF signal on line 18 is also applied to the noncoherent detector circuit 24 shown in phantom lines which comprises a bandpass filter 25 coupled to a square law detector 26. The square law detector 26 is coupled to an integrator 27 which is in turn coupled to a threshold comparator circuit 28 which produces a PN detect signal on line 29 indicating that the locally generated PN code sequence at the demodulator is aligned, or in partial alignment or correlation with the PN code on the incoming direct sequence spread spectrum signal. The PN detect signal on line 29 is applied to a search control 31 which supplies a control signal on line 32 capable of controlling the slip of the code sequence generated by the local PN generator 33. The PN code sequence from generator 33 is applied to the correlator/mixer 17 via line 34.

The IF signal on line 16 is also applied to a code tracking loop 35 which generates a PN clock signal on line 36 which is applied to the PN generator 33.

The demodulator shown in prior art FIG. 1 is of the simplest form for tracking a direct sequence spread spectrum signal having single PN code sequence and is not designed for tracking the component codes of a composite code sequence.

Figure 2:
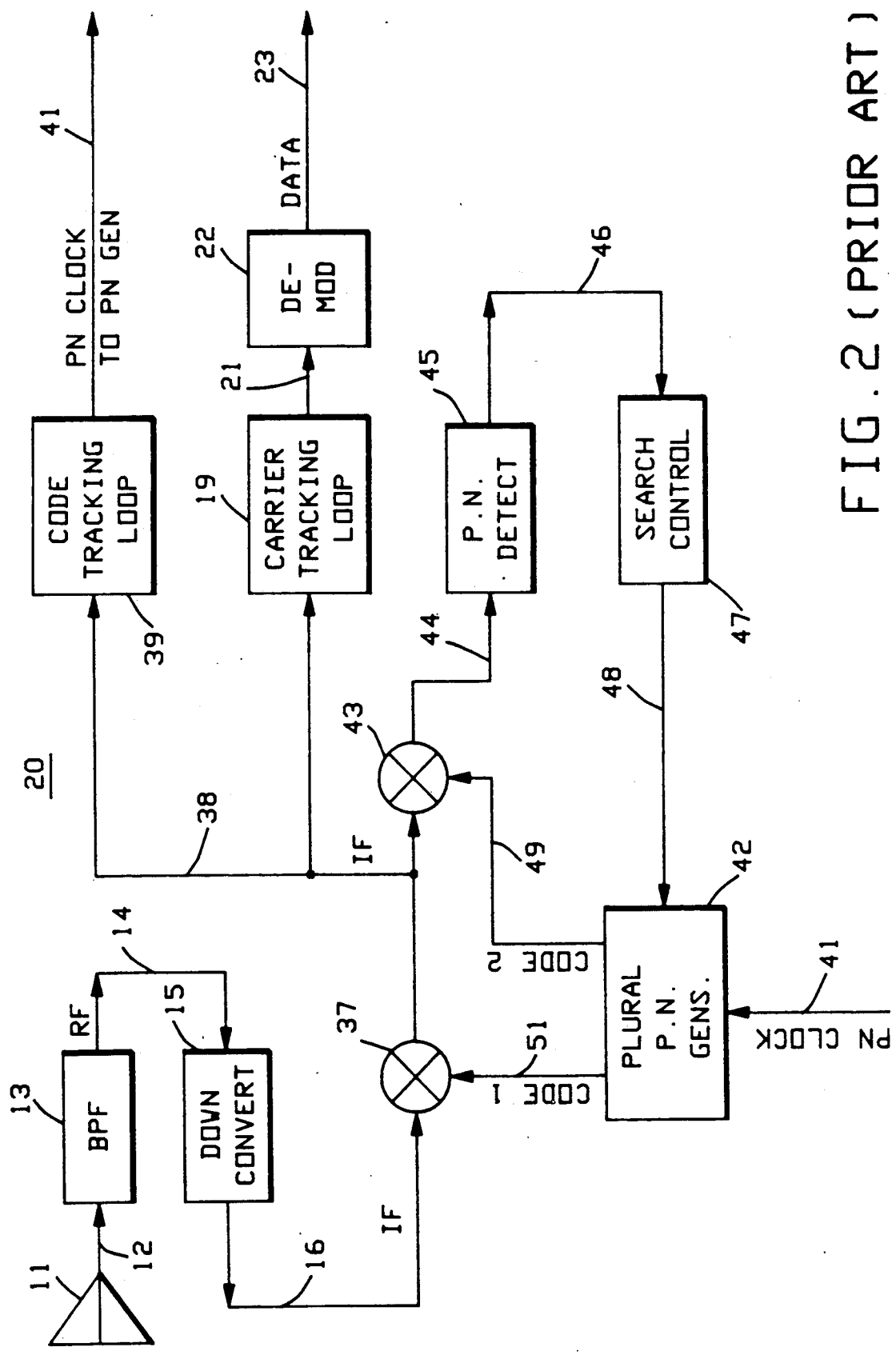
FIG. 2 is a block diagram of a prior art spread spectrum demodulator for noncoherent detection of a composite PN code sequence.

Refer now to FIG. 2 showing a prior art demodulator for noncoherent detection of a composite PN code sequence having acquisition and tracking code properties as explained in U.S. Pat. No. 4,225,935. The receiving antenna 11 and elements 12-16 are the same as those previously described with respect to FIG. 1 and do not require additional explanation herein. The IF signal on line 16 is applied to a correlator/mixer 37 to provide, after code alignment, a despread IF data signal on line 38. The IF signal on line 18 is also applied to the carrier tracking loop 19 of the type explained hereinbefore. In the same manner, the output on line 21 to demodulator 22 produces a data signal on line 23 as explained hereinbefore. The signal on line 38 from the output of the correlator/mixer 37 is also applied to a code tracking loop 39 which functionally is the same as the code tracking loop 19 but requires a slightly different structure since the signal is produced after the mixer 37. The output of the code tracking loop on line 41 provides the PN clock which is applied to the input of the PN generator 42. The data signal on line 38 is also applied to a second correlator/mixer 43 to produce a signal on line 44 to be explained in greater detail hereinafter. If the system is completely locked onto the incoming signal, the signal on line 44 is exactly the same as the signal on line 38. When not fully aligned, and during the sequential search of each of the component codes, there is a noise-like signal on line 44 which is applied to the PN detector 45 which senses the condition of alignment or non-alignment of the code sequence and produces a detection signal on line 46 which is applied to the search controller 47. The control or command signals on line 48 which are applied to the PN generator 42 control the structure as well as the slippage of alignment of both codes 1 and X.

During the acquisition of the received composite acquisition code on line 16, the code 1 signal on line 51 becomes active and code x on line 49 is deactivated. The phase of code 1 is sequentially slipped under control of the search control 47 until code 1 is properly phase aligned with the received composite acquisition PN code sequence on line 16. Once code 1 is in proper phase alignment, the signal on lines 38 and 44 will contain a data IF signal which can be detected by PN detect circuit 45. With a data IF signal present on line 38, code tracking loop 39 and carrier tracking loop 19 will have the required input signal to acquire and maintain code lock and carrier lock respectively. The PN Detect signal on line 46 from the non-coherent detect circuit 45 then goes to a logic high condition, indicating to the search control 47 that code 1 is properly aligned.

After code 1 is properly phase aligned, code 1 remains active and remains in proper phase alignment with the received composite PN code sequence until code x is properly aligned which will be explained hereinafter. After acquisition of code 1, code x becomes active and contains the next code to be searched—code 2. The phase of code 2 on line 49 is then sequentially slipped under control of the search control 47 until the phase of code 2 on line 49 is properly aligned with the input composite code on line 16. Once code 2 is in proper phase alignment, the signal on line 44 will contain a data IF signal which can be detected by PN detect circuit 45. The PN detect signal on line 46 from the noncoherent detect circuit 45 then goes to a logic high condition, indicating to the search control 47 that code 2 is properly aligned. Search control 47 then commands plural PN generators 42 on line 32 to change code x to the next PN code to be searched, code 3. The search process described above for code x is then repeated for codes 3, 4 . . . N, . . . until all of the component codes have been searched and are in proper phase alignment with input composite PN code on line 16. Thus, it will be understood that code 1 is maintained while different code x's are sequentially changed until all of the component codes are aligned. It is further understood that the correlation properties of the composite and component codes must be properly designed to provide the proper code correlation properties as explained under the description of the prior art.

After alignment of code 1, the signal on line 38 will contain a data IF signal plus thermal noise plus another noise-like signal. The noise-like signal results since code 1 on line 51 is only partially correlated (typically 50 percent) with the received composite PN code IF signal on line 16. This partial correlation property of PN code 1 with the received composite PN code sequence on line 16 permits the carrier tracking loop 19 and code tracking loop 39 to acquire and maintain carrier and code track, respectively, during the search of the remaining component codes (codes 2 through N).

Figure 3:
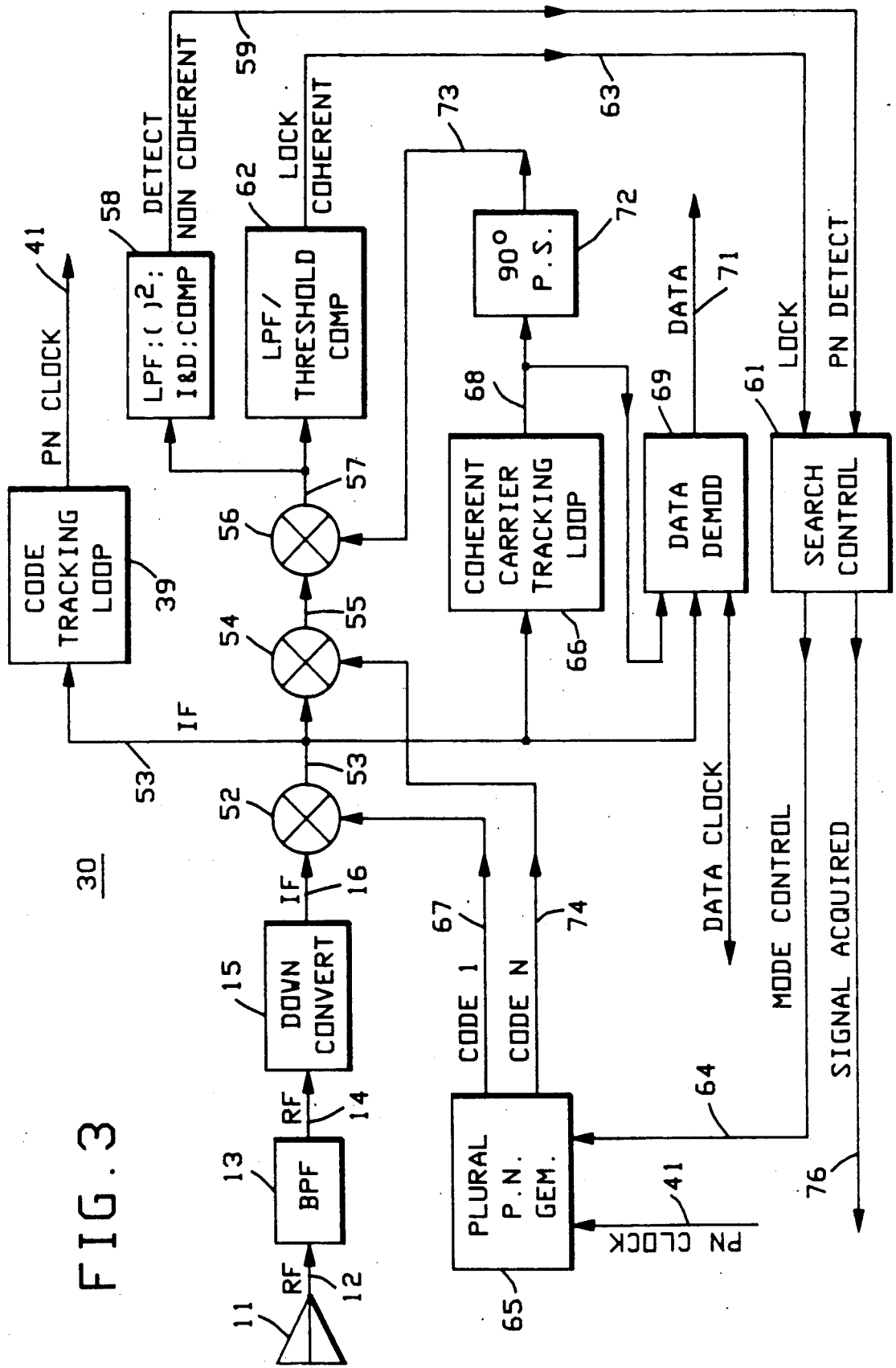
FIG. 3 is a simplified block diagram showing the present invention circuit for noncoherent and coherent detection, and for coherently tracking the carrier of a component code, direct sequence spread spectrum input signal.

Refer now to FIG. 3 showing a present invention demodulation circuit for noncoherent AND coherent detection, and for coherently tracking the carrier of a component code. The elements 11-16 in FIG. 3 are numbered the same as the elements in FIGS. 1 and 2 and perform the identical function and do not require additional explanation for the demodulator 30. By design, the IF signal on line 16 contains a residual carrier which is used for carrier tracking and signal detection. The IF signal on line 16 is applied to a correlator/mixer 52 to produce an IF data signal on line 53 substantially the same as the signal on line 38 of FIG. 2. The signal on line 53 is applied to a code tracking loop 39 substantially the same as the previously described code tracking loop 39 to produce a PN clock signal on line 41, as explained hereinbefore.

The data signal on line 53 is applied to a second correlator/mixer 54 and the output therefrom on line 55 is applied to a down converter/mixer 56 to provide a baseband signal on output line 57 which is applied to the two branches of the novel detector circuit. The baseband signal on line 57 is applied to the upper or noncoherent detector circuit branch 58 comprising a low pass filter, a square law detector, an integrate and dump circuit and a threshold comparator. The noncoherent detector circuit 58 differs from the detector circuit 24 in that a low pass filter is provided at the input instead of a bandpass filter. The PN detect signal on line 59 is applied to the search controller 61 whose function will be explained in greater detail hereinafter. The baseband signal on line 57 is applied to the coherent detection circuit branch 62 comprising a low pass filter and a threshold comparator. The output of the coherent detector 62 on line 63 is applied to the search controller 61 which produces the command or mode control signals on line 64 for controlling the PN generator 65.

At the same time, the detection circuits are attempting to detect alignment or partial alignment on the first PN code, the coherent carrier tracking loop circuit 66 is attempting to coherently lock on the signal on line 53. As explained hereinbefore, with reference to FIG. 2, the code 1 from generator 65 on line 67 is always present. After code 1 is correlated with the incoming IF signal on line 16, the coherent carrier tracking loop 66 may coherently lock onto the carrier signal present at the output of correlator 52 on line 53. It will be noted that the carrier loop 66 coherently locks onto the carrier signal after code 1 is properly aligned. The coherent lock is indicated by the signal on output line 63. The output of the carrier loop on line 68 is applied to a data demodulation circuit 69 to produce a data signal on output line 71. The coherently recovered IF carrier signal on line 68 is also applied to a 90° phase shifter 72 to provide a quadrature phase shifted IF carrier signal on line 73 which is applied to one of the inputs of the down converter/mixer 56.

Assume now that the search controller 61 commands the PN generator 65 to produce a new component code N on line 74 after code 1 is aligned. Until code N on line 74 is aligned with the code signal on line 53, the output from correlation/mixer 54 on line 55 has a noise-like signal present therein. Thus, the outputs from the two detection branches on lines 59 and 63 will indicate that code N is out of alignment until such time as code N aligns with the incoming signal on line 53. In the present invention, the output signal on line 59 is now totally disregarded at this time because the signal on line 57 may now be coherently detected by the coherent detection branch 62. Since the alignment of code N and the subsequent codes on line 74 are detected (detectable) coherently, the acquisition of the complete composite code comprising a plurality of component codes is detected and locked on coherently which is much faster than prior art noncoherent detection systems.

The data clock signal on line 75 may be derived internally in the data demodulator 69. The output signal on line 76 from search control 61 is a signal indicating that the component codes have been acquired and is transmitted back to the cooperative transmitter from the demodulator receiver 30.

To summarize the novel mode of operation, only code $PN_1$ need be acquired noncoherently, because the coherent carrier tracking loop 66 tracks the carrier and the coherent detection branch 62 lock onto the code 1 signal $PN_1$. Thus, each subsequent step 2 to step N coherently acquires (detects) each component code $PN_2$ to $PN_N$ until all component codes are acquired. The cooperating transmitter, after being notified that all component codes are acquired, generates and transmits a composite tracking code comprising the component codes.

TABLE 1

| | Search Sequence | @ 67 Code 1 | @ 74 Code N |
|---|---|---|---|
| Step 1 | Search $PN_1$ | $PN_1$ | Logic "1" enable |
| Step 2 | Search $PN_2$ | $PN_1$ | $PN_2$ |
| Step 3 | Search $PN_3$ | $PN_1$ | $PN_3$ |
| Step N | Search $PN_N$ | $PN_1$ | $PN_N$ |

TABLE 1-continued

| | Search Sequence | @ 67 Code 1 | @ 74 Code N |
|---|---|---|---|
| Step N+ | TRACKING | $PN_2 \oplus PN_2 \oplus \ldots PN_N$ | Logic "1" enable |

Table 1 above shows the sequence of search steps leading to acquisition of the component codes of a composite code. For purposes of Table 1, only three steps are shown followed by step N for the last of the component codes. During step 1, the component code $PN_1$ is being searched and a PN code 1 is presented on line 67. During this first step, a logic ONE enable on line 74 is presented to the input of correlator/mixer 54 to enable the mixer but to have no effect on the acquisition of information being transmitted from input line 53 to output line 55. During step 2, code N line 74 is active with the PN code 2 ($PN_2$) on line 74 and PN code 1 ($PN_1$) is active on line 67. After PN code 2 is acquired, the system moves to step 3 and performs the same sequence of operations on PN code 3 ($PN_3$). At step N, PN code 1 line 67 remains active with $PN_1$ and the PN code N is being searched is active on code N line 74. After all of the component codes ending with the last step N and the search for PN code N which is acquired by searching code $PN_N$, the system moves to step $N_+$ showing that step N is completed. The search sequence when complete moves the system into the tracking mode. During the tracking mode, the code on code 1 line 67 is now the EXCLUSIVE ORed result of all of the component PN codes and the signal on code N line 74 is now again raised to a logic ONE enable signal. As mentioned hereinbefore, after all PN codes are acquired and the system is tracking, an acquired code signal may be raised on line 76 to notify the cooperating transmitter to enter into the track mode and transmit a tracking code. During the track mode, the tracking code is equal to the results of the EXCLUSIVE ORing of all of the individual component codes $PN_1$-$PN_N$. By design, any one of the component codes has a 50% correlation with the acquisition code. During tracking, code 1 is designed to equal the tracking code which results in a full code correlation of the signal on line 16 with code 1 on line 67. Furthermore, the tracking code is designed to have a 50% correlation with the acquisition code.

Figure 4:
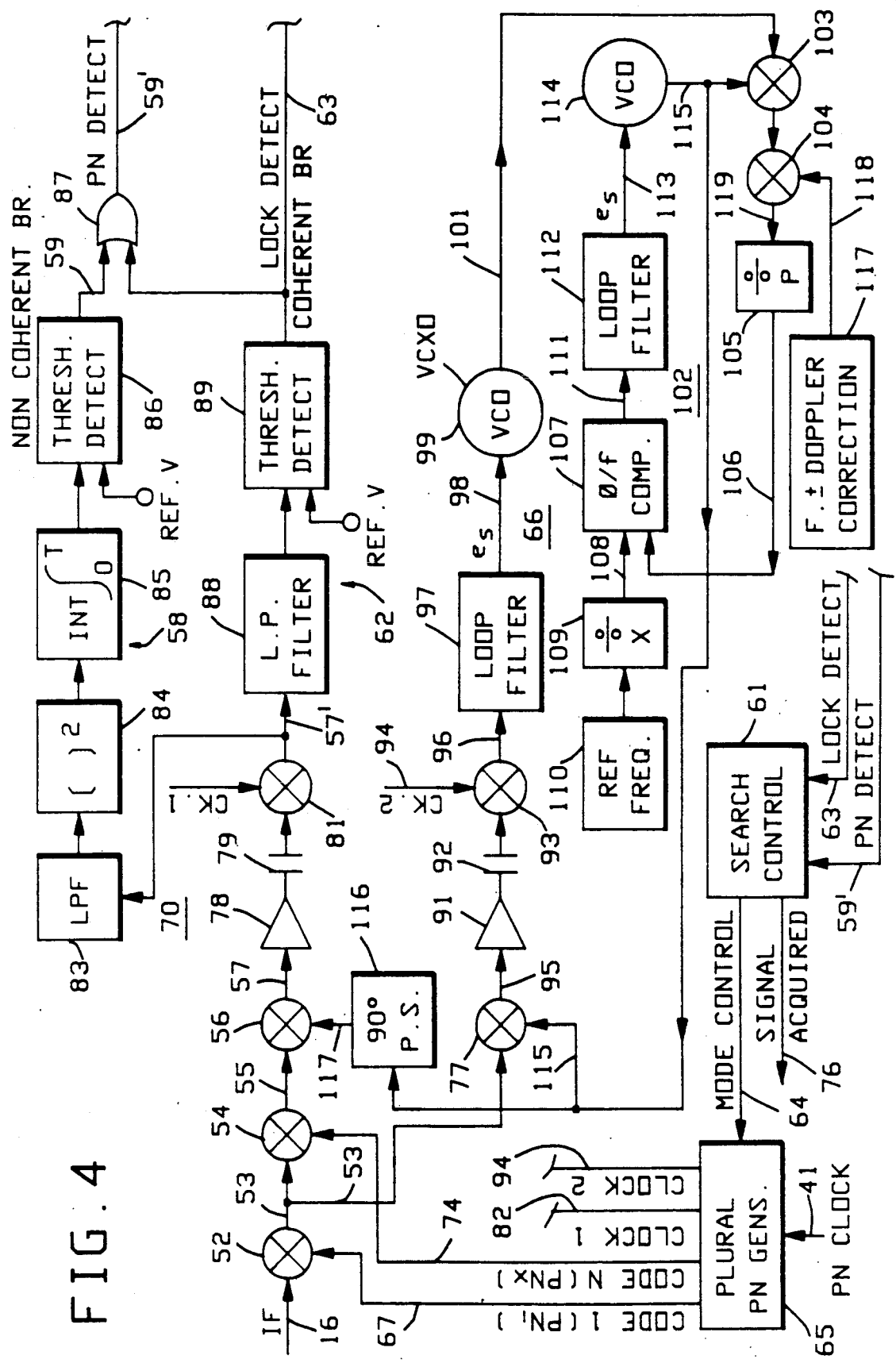
FIG. 4 is a more detailed block diagram of a preferred embodiment of the present invention circuit for noncoherently and coherently detecting and for coherently tracking the carrier of a component code, direct sequence spread spectrum input signal.

Refer now to FIG. 4 showing a block diagram of the preferred embodiment of the present invention having circuits for noncoherent and coherent detection and for coherently tracking the carrier of the component codes. The data-modulated direct sequence spread spectrum IF signal on line 16 is the same as the IF signal on FIGS. 1 to 3. This signal is applied to a correlator/mixer 52 to produce a data modulated IF carrier signal on line 53 which contains noise because the incoming composite signal is not fully correlated with the code signal on line 67 from the PN generator 65. The signal on line 53 is applied to a second correlator/mixer 54 and to a down converter/mixer 77. In similar manner, the IF signal on line 55 is applied to a down converter/mixer 56 to produce a baseband signal on line 57 which is applied to an amplifier 78 having its output A.C. coupled through a capacitor 79 and applied to the input of a multiplier 81 which has a second clock input from line 82, to be described in greater detail hereinafter. The output of the multiplier 81 on line 57' is the baseband signal which during acquisition is a beat note and after acquisition is a D.C. value. The purpose of the A.C. coupling means (amplifier 78, capacitor 79 and multiplier 81) is to remove D.C. error signals produced by the hardware implementation of the down converter/mixer 56. By applying clock 1 on line 82 in synchronism with the PN code 1 from the PN generator 65, clock 1 is synchronized to the incoming signal when code 1 alignment is achieved. The incoming signal was modulated by clock 1 and clock 2 at the modulator of the transmitter in synchronism with PN code 1. The noncoherent detection branch 58 is shown having a low pass filter 83, a square law detector 84, an integrate and dump circuit 85 and a threshold detector comparator 86 which produces the noncoherent detection signal on line 59, now shown coupled to the input of an OR gate 87 to produce the PN detect signal on line 59'. Similarly, the coherent lock detection branch 62 is shown comprising a low pass filter 88 coupled to a threshold detector comparator 89 to provide the coherent lock detection signal on line 63, as explained hereinbefore. The lines 59 and 63 from the noncoherent and coherent branches of the detector are shown applied to a search controller 61 which produces the command control signals on line 64, as explained hereinbefore. Further, when the incoming signal is fully acquired, the search control 61 produces a signal acquired output on line 76 which is transmitted back to the cooperating transmitter, also as explained hereinbefore. The PN clock on line 41 was produced by the code tracking loop 39, as explained with reference to FIG. 3 and does not require additional explanation. The IF signal on line 53 is applied to the down converter/mixer 77 which is at the input to the coherent carrier tracking loop. The output of mixer 77 is applied to an amplifier 91 whose output is A.C. coupled through capacitor 92 to the input of a multiplier 93 having a second input designated as clock 2. For purposes of the present invention, clock 2 on line 94 may be identical to clock 1 on 82 which was identified as a code 1 clock signal. As explained hereinbefore, the reason for A.C. coupling, the output signal from down converter/mixer 77 on line 95 is to remove the undesired D.C. voltage signals produced by the hardware implementation of down converter/mixer 77. The baseband signal output from multiplier 93 on line 96 is applied to a loop filter 97 to produce an error signal $e_=$ on line 98 which is applied to a voltage controlled oscillator 99 that would ordinarily complete the prior art carrier tracking loop.

The highly stable voltage controlled crystal oscillator 99 produces a frequency signal on line 101 which is applied to the embedded frequency offset loop 102 which will now be described. In the preferred embodiment of the present invention, the offset loop 102 comprises a multiplier 103 which is coupled at its output to a mixer 104 whose output is coupled to a divide-by-P circuit 105. The output of the circuit 105 on line 106 is applied to the phase/frequency comparator 107 which is shown having a second input on line 108 from the divide-by-X circuit 109 which in turn is coupled to a highly accurate frequency reference source 110. The comparator 107 compares the frequency and phase of the signals on line 106 and 108 to provide an unfiltered error signal on output line 111 which is applied to a loop filter 112 to produce an error signal $e_=$ on line 113 which is applied to a voltage controlled oscillator 114 whose output on line 115 is applied to the multiplier 103 and also fed back to a 90° phase shifter 116 whose output on line 117 is applied to the correlator/mixer 56. The input signal on line 115 to the down converter/mixer 67 completes the carrier tracking loop.

The dividers 105 and 109 are selected in conjunction with the oscillator frequency of oscillator 99 to assure that the signal on line 115 is equal to the center frequency of the IF signal on line 53.

When an airborne platform or station is transmitting and receiving signals to and from another moving station or a ground station, there is always a doppler frequency effect introduced due to the relative motion of the stations. The doppler effect results in an IF center frequency shift of the signal on line 16 which increases the search bandwidth or search frequency. When it is possible to estimate or calculate the doppler effect, a doppler correction may be introduced into the frequency offset loop 102 which is embedded in series in the carrier tracking loop. Doppler correction means 117 is shown producing a doppler frequency offset signal on line 118 which is applied to mixer 104 to produce a doppler corrected signal on line 119. By providing a frequency offset loop 102, it is shown that any known information which enables doppler frequency correction may be automatically introduced into the carrier tracking loop.

Having explained a preferred embodiment of the present invention, it will be understood that the stability on the carrier tracking loop 66 is substantially enhanced and is equal to the stability of the highly accurate voltage controlled crystal oscillator 99 because the frequency offset loop 102 is tied to the highly accurate reference frequency source 110. Further, the novel tracking and detecting circuits shown in FIG. 4 permit faster acquisition than was heretofore possible. When the first component code is being acquired, the noncoherent branch 58 is attempting to produce a PN detect signal when alignment occurs. At the same time the noncoherent branch 58 is attempting to produce its alignment PN detect signal, the carrier tracking loop 66 is obtaining frequency and phase lock with the input signal on line 53. Once phase lock is achieved in the carrier tracking loop 66, the coherent detection branch 62 may achieve its lock and produce the lock detect signal on line 63. It is possible that the lock detect signal on output line 63 can be produced prior to the alignment signal on line 59 during a code 1 search and alignment operation. This is especially true when the frequency offset is very small. Thus, a signal on line 59 OR a signal on line 63 indicates alignment and a signal on line 63 indicates lock condition.

After alignment and lock of the code 1 signal shown as $PN_1$, the code 2 signal, which was previously an enable signal on line 74, is changed to the $PN_2$ component code value and the search for the component code $PN_2$ is made. After the composite code $PN_2$ is acquired, then the sequential $PN_3$ to $PN_N$ component codes are present on line 74 until all of the component codes are acquired. Once the last $PN_X$ code on line 74 is acquired, the acquisition signal on line 76 may be raised indicating full acquisition of the incoming composite code. During the acquisition of the component codes, $PN_2$ to $PN_N$, the carrier tracking loop is coherently locked to the signal on line 53. Because the carrier tracking loop 66 is coherently locked to the signal on line 53, it is possible to employ the novel coherent detection branch 62 to detect the incoming component codes $PN_2$ to $PN_N$. Not only does the coherent detection branch 62 provide faster acquisition of the component codes, but it is known that coherent signal detection apparatus provides a better signal-to-noise ratio than a noncoherent apparatus.

What is claimed is:

1. A detection and tracking circuit for fast acquisition of a PN composite code composed of PN component codes, comprising:
   a first correlator/mixer having an input coupled to receive a signal containing a down converted PN composite code,
   a PN generator having a first PN, component code output and a second component code $PN_X$ output for producing $PN_2$ to $PN_N$ component codes,
   said $PN_1$ code output being coupled to said first correlator/mixer for producing a data modulated IF carrier signal output, coupled to an input of second correlator/mixer and to a coherent carrier tracking loop,
   said second correlator/mixer having an input coupled to said $PN_X$ output from said PN generator and an output coupled to a down converter/mixer which provides a baseband data bearing signal output,
   said baseband data bearing signal output being coupled to a noncoherent detection branch and to a coherent lock detection branch,
   said noncoherent detection branch providing means for detecting the alignment of said first $PN_1$ component code with said PN composite code to be acquired, and
   said coherent lock detection branch providing means for coherently detecting alignment of said $PN_2$ to $PN_N$ component codes with said PN composite code.

2. A detection and tracking circuit as set forth in claim 1 wherein said data modulated IF carrier signal output is further coupled to a data demodulator for producing a sequence of data signals.

3. A detecting and tracking circuit as set forth in claim 1 wherein the output of said coherent carrier tracking loop is coupled to a data demodulator for producing a sequence of data signals.

4. A detecting and tracking circuit as set forth in claim 3 wherein said output of said coherent carrier tracking loop is further coupled to said down converter/mixer through a quadrature phase shifter.

5. A detecting and tracking circuit as set forth in claim 1 wherein said data modulated IF carrier signal output is further coupled to a code tracking loop for producing a PN clock signal.

6. A detecting and tracking circuit as set forth in claim 1 wherein of said noncoherent and said coherent detecting branches are provided with outputs coupled to a search controller for producing command control signals which control a search sequence of said PN generator.

7. A detecting and tracking circuit as set forth in claim 6 wherein said PN generator produces a $PN_1$ component code for a first $PN_1$ search sequence at the input of said first correlator/mixer and produces an enable $PN_X$ component code signal at the input of said second correlator/mixer.

8. A detecting and tracking circuit as set forth in claim 7 wherein the second and subsequent $PN_2$ to $PN_N$ component codes are searched by said PN generator to produce a $PN_1$ component code at the input of said first correlator/mixer and produce $PN_2$ to $PN_N$ component codes, respectively, at the input of said second correlator/mixer.

9. A detection and tracking circuit as set forth in claim 1 wherein said noncoherent detecting branch comprises a low pass filter coupled to the baseband output of said down converter/mixer.

10. A detecting and tracking circuit as set forth in claim 1 which further comprises means for A.C. coupling the output of said down converter/mixer to said noncoherent and said coherent detection branches.

11. A detecting and tracking circuit as set forth in claim 10 wherein said means for A.C. coupling the output of said down converter/mixer comprises an amplifier and a capacitor in series with a multiplier for reducing D.C. noise offset produced by the down converter/mixer.

12. A detecting and tracking circuit as set forth in claim 11 which further includes a predetermined clock signal synchronized with the incoming $PN_1$ signal from said PN generator is coupled to an input of said multiplier for restoring the error signal produced by the down converter/mixer.

13. A detecting and tracking circuit as set forth in claim 12 wherein said predetermined clock signal is a Manchester coded clock signal synchronized with the first component code $PN_1$.

14. A detecting and tracking circuit as set forth in claim 1 which further comprises means for A.C. coupling the IF carrier signal output of from said first correlator/mixer to said coherent carrier tracking loop.

15. A detecting and tracking circuit as set forth in claim 14 wherein said means for A.C. coupling the output of said mixer comprises an amplifier, a capacitor, and a multiplier in series.

16. A detecting and tracking circuit as set forth in claim 1 which further includes a frequency offset loop embedded in series in said coherent carrier tracking loop for providing means for compensating for doppler frequency shift of the PN composite code being received.

17. A detecting and tracking circuit as set forth in claim 16 wherein said frequency offset loop comprises means for presenting doppler error correction information into said coherent carrier tracking loop.

18. A detecting and tracking circuit as set forth in claim 17 wherein said frequency offset loop comprises a highly accurate reference frequency source.

19. A detecting and tracking circuit as set forth in claim 18 wherein said frequency offset loop further includes a pair of dividers for coupling the output of said frequency reference source and said means for presenting doppler error correction information to a highly accurate voltage controlled crystal oscillator.

* * * * *